United States Patent Office 3,772,250
Patented Nov. 13, 1973

3,772,250
BRANCHED AROMATIC POLYESTERS CONTAINING CYANURYL NUCLEUS RADICALS
James Economy, Eggertsville, Steve G. Cottis, Amherst, and Bernard E. Nowak, Lancaster, N.Y., assignors to The Carborundum Company, Niagara Falls, N.Y.
No Drawing. Filed Dec. 8, 1970, Ser. No. 96,234
Int. Cl. C08g 17/02, 17/08
U.S. Cl. 260—47 CP  11 Claims

ABSTRACT OF THE DISCLOSURE

Branched, wholly aromatic polyesters of Formula I (I) 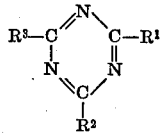

wherein $R^1$, $R^2$ and $R^3$ each consist essentially of a plurality of moieties selected from the group having the Formulas II, III, and IV (II) 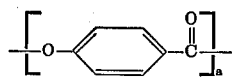

(III) 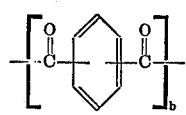

(IV) 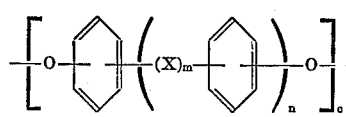

and wherein X is

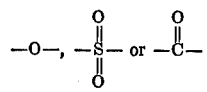

$m$ is 0 or 1; $n$ is 0 or 1; $a$ is 0–40; $b$ is 0–20; $c$ is 0–20; and $a+b+c$ is 2–40.

---

This invention relates to polyesters, and more particularly to branched polyesters wherein branching occurs by virtue of a cyanuryl nucleus to which linear polyester chains are attached. Still more particularly, the novel branched polyesters of this invention are substantially wholly aromatic, that is, the linear polyester chains attached to the cyanuryl nucleus consist solely of aromatic structural units, although the chains may in some instances terminate with an aliphatic end group. The invention further relates to methods for the preparation of such branched aromatic polyesters, to methods of curing and cross-linking such polyesters, and to cured and cross-linked polyesters produced thereby.

Linear aromatic polyesters are well-known in the art. For example, linear polyesters consisting of repeating p-oxybenzoyl structural units in the polyester chain, sometimes termed p-oxybenzoyl homopolyesters, have been reported. Linear aromatic polyesters have also been reported which consist of recurring, alternating structural units of two types in the polyester chain: (1) isophthaloyl or terephthaloyl; and (2) para- or meta-dioxyphenylene. Both of these types of linear aromatic polyesters are highly advantageous in that they possess marked thermal stability, especially in contrast to linear polyesters which contain aliphatic as well as aromatic structural units in the polymer chain. However, both types also have serious disadvantages. For example, p-oxybenzoyl homopolyesters are difficult to fabricate into desired shapes by most conventional methods because at high temperatures they tend to thermally degrade rather than melt, and accordingly such conventional forming techniques as casting, injection molding and extrusion are precluded. The same is true of the other aforementioned linear aromatic polyesters, especially if the structural units are of the para configuration, and while introduction of some structural units of the meta configuration may improve fabricability, it does so at the expense of thermal dimensional stability.

The branched aromatic polyesters of the present invention represent a significant advance over the prior art linear polyesters. In general, they possess the primary advantage of the linear aromatic polyesters, viz., outstanding thermal stability, while often being more easily fabricable by virtue of a lower melting or softening point. Moreover, being branched, many polyesters of the invention lend themselves to cross-linking to produce polyesters having superior thermal properties, an advantage not generally possessed by linear polyesters.

According to the present invention there are provided novel branched, wholly aromatic polyesters of Formula I (I) 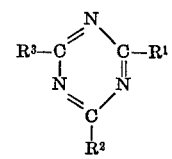

wherein

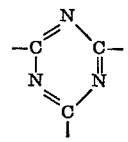

is a cyanuryl nucleus and wherein $R^1$, $R^2$ and $R^3$ each consist essentially of a plurality of moieties or structural units selected from the group having the Formulas II, III and IV (II) 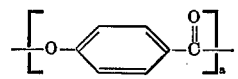

(III) 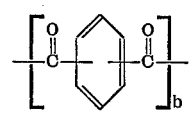

(IV) 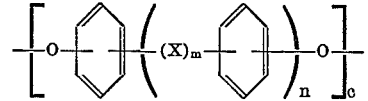

$a$, $b$ and $c$ being integers representing the total number of the respective moieties in each of $R^1$, $R^2$ and $R^3$; wherein X is —O—,

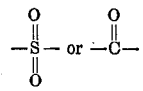

$n$ is 0 or 1 and when $n$ is 1, $m$ is 0 or 1; $a$ is an integer from 0 to about 40; $b$ is an integer from 0 to about 20; $c$ is an integer from 0 to about 20; $a+b+c$ is an integer from 2 to about 40; and the average value of $a$, $b$ and $c$ for $R^1$, $R^2$ and $R^3$ is from 2 to about 40. The carbonyl groups of the moiety of Formula III are either para or meta to each other, as is conventionally indicated by the fact that the lines leading to the ring from the carbonyl groups intersect sides of the ring rather than being connected to specific apices thereof. Accordingly, the dicarbonyl moiety of Formula III is either isophthaloyl or terephthaloyl, or both within the same polyester chain. Similarly, the oxy groups of the moiety of Formula IV are either para or meta to each other, as is conventionally indicated, and accordingly the moiety of Formula IV may be either meta- or para-dioxyarylene, or both within the same polyester chain. When $n$ is equal to 1 in Formula IV, para refers to the 4,4' positions and meta refers to the 3,4' or 3,3' positions. In the polyesters of Formula I, the oxy groups of the moieties of Formulas II and IV are linked to a carbonyl group of a moiety of Formulas II or III or to a carbon atom of the cyanuryl nucleus; the carbonyl groups of the moieties of Formulas II and III are linked to an oxy group of a moiety of Formulas II or IV; and the carbon atoms of the cyanuryl nucleus are linked to an oxy group of a moiety of Formulas II or IV. When $a$ is 0, $b$ is an integer from 1 to about 20 and $c$ is an integer from 1 to about 20. When $b$ is 0, $a$ is an integer from 1 to about 40 and $c$ is 0 or 1. When $b$ and $c$ are each 0, $a$ is an integer from 2 to about 40.

Preferably, $n$ is equal to 0 in Formula IV, in which case the meta- or para-dioxylarylene moiety is a meta- or para-dioxyphenylene moiety of Formula V

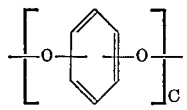

wherein $c$ has the same significance as described above. It is also preferable that $R^1$, $R^2$ and $R^3$ each consist essentially of the same types of moieties, preferably in approximately the same proportions.

A particularly desirable type of branched aromatic polyesters of Formula I consists of those polyesters containing the p-oxybenzoyl moiety of Formula II, either with or without the additional presence of the moieties of Formulas III and IV; i.e., where $a$ is an integer from 1 to about 40.

It will be apparent that the number of moieties linked together to from the polyester chains represented by $R^1$, $R^2$ and $R^3$ must be an integer, as represented by $a$, $b$ and $c$. However, in many cases it is impractical or even impossible with available analytical techniques to determine the precise number of moieties in an individual polyester chain. Accordingly, the number of moieties in the polyester chain is often more conveniently expressed as the average number of moieties in the three chains, i.e., the average of $a$, $b$ and $c$ for $R^1$, $R^2$ and $R^3$. In most cases this average is determined as the average value of $a$, $b$ and $c$ for all of the molecules making up the particular batch of branched polyester being tested.

In accordance with the invention, low molecular weight branched polyesters may be produced having an average of from 2 to about 10 moieties or structural units in each polyester chain, corresponding to a molecular weight in the range from about 800 to about 2300. Such branched polyesters are frequently referred to herein as prepolymers, and their principal utility resides in the fact that their molecular weight may be increased by cross-linking or by extending the length of the polyester chains. Many of these prepolymers are fusible. They may be processed into a desired physical form and subsequently advanced to a high molecular weight polyester having outstanding thermal stability.

Higher molecular weight branched polyesters may also be produced according to the invention. It appears that about 40 structural units is the practical maximum number attainable in the polyester chains, corresponding to a maximum molecular weight from about 14,000 to about 25,000. Many of these higher molecular weight polyesters having an average polyester chain length of more than about 10 structural units up to about 40 units are useful as thermoplastic molding materials having excellent high temperature properties. They may be processed, for example, by compression molding, impact molding, ram extrusion or plasma spraying to make gaskets, bearing sleeves, protective coatings, electrical insulating coatings and the like. Many of the branched polyesters of the invention are also useful for the formation of films and fibers, as adhesives, and as matrices for fiber-reinforced composites.

A variety of procedures and synthetic routes may be employed to produce the branched polyesters of the invention, and they are discussed in detail hereinafter. All involve a reaction or sequence of reactions between suitable reactants which provide the cyanuryl nucleus and the desired moieties of Formulas II, III and IV.

The cyanaryl nucleus is suitably provided by a cyanuric halide such as cyanuric bromide, cyanuric iodide, or preferably cyanuric chloride, which is less expensive.

The p-oxybenzoyl moiety of Formula II is suitably provided by any compound of Formula VI (VI) 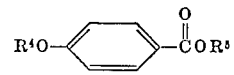

wherein $R^4$ is lower alkanoyl, benzoyl, or preferably hydrogen and $R^5$ is hydrogen, lower alkyl, benzyl, or phenyl wherein one or more hydrogens are replaced by halogen or lower alkyl, phenyl being preferred. The term "lower" as applied herein to alkyl and alkanoyl refers to a content of from one to six carbon atoms. Examples of compounds of Formula VI include, among others, p-hydroxybenzoic acid, phenyl p-hydroxybenzoate, p-acetoxybenzoic acid, n-butyl p-acetoxybenzoate, n-propyl p-hydroxybenzoate, ethyl p-hydroxybenzoate, phenyl p-acetoxybenzoate, phenyl p-benzoyloxybenzoate, benzyl p-hydroxybenzoate, p-cyclohexanecarbonyloxybenzoic acid, cresyl p-hydroxybenzoate and m-chlorophenyl p-hydroxybenzoate. Phenyl p-hydroxybenzoate is especially preferred, primarily because of its thermal stability and reactivity.

The isophthaloyl or terephthaloyl moiety of Formula III is suitably provided by isophthaloyl chloride or terephthaloyl chloride, or by any compound of Formula VII (VII) 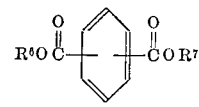

wherein $R^6$ and $R^7$ independently are hydrogen, lower alkyl, benzyl, phenyl, or phenyl wherein one or more hydrogens are replaced by halogen or lower alkyl, phenyl being preferred. Examples of compounds of Formula VII include, among others, isophthalic acid, terephthalic acid, diphenyl isophthalate, diphenyl terephthalate, methyl ethyl terephthalate, dibenzyl isophthalate, dicresyl terephthalate, di-p-chlorophenyl isophthalate and dicyclohexyl terephthalate. Diphenyl isophthalate and diphenyl terephthalate are especially preferred because of their thermal stability and reactivity.

The meta- or para-dioxyarylene moiety of Formula IV is suitably provided by any compound of Formula VIII (VIII) 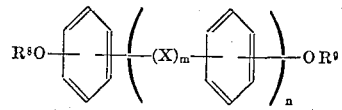

wherein X, $m$ and $n$ have the meaning described above and $R^8$ and $R^9$ independently are lower alkanoyl, benzoyl, or preferably hydrogen. Examples of compounds of Formula VIII include, among others, hydroquinone, resorcinol, m-phenylenediacetate, p-phenylenediacetate, p,p'-biphenol, p,p'-oxybiphenol, 4,4'-dihydroxydiphenyl sulfone, and 4,4'-dihydroxybenzophenone. Hydroquinone and resorcinol are preferred primarily because of their reactivity and/or lower cost.

The compounds of Formulas VI or VIII will react with a cyanuric halide, e.g., cyanuric chloride, whereby $R^4$, $R^8$ or $R^9$ combines with the halogen to produce the corresponding halide as a by-product and whereby the p-oxybenzoyl moieties or dioxyarylene moieties are attached to the carbon atoms of the cyanuric halide via ether linkages. It is by virtue of such reactions that branching is accomplished according to the invention. Also, condensation reactions may occur as between $R^4$, $R^8$ or $R^9$ and $OR^5$, $OR^6$ or $OR^7$ whereby the corresponding ester is produced as a by-product and the respective moieties link together via an ester linkage. It is by virtue of such condensation reactions that polyester chains are elaborated according to the invention. Ester-ester interchange may, in some cases, occur as between polyester chains of different molecules, whereby the chain lengths and/or the order of the moieties in the chains may be altered. It is apparent that each polyester chain attached to the cyanuryl nucleus will have a terminal group, the terminal group of a given polyester chain corresponding to the specific $R^4$, $R^5$, $R^6$, $R^7$, $R^8$ or $R^9$ present in the reactant selected. It is also apparent that, as illustrated in the examples and described elsewhere herein, the composition, number of structural units per chain, and molecular weight of the polyesters will depend not only upon the reactants selected, but upon the molar ratio thereof, in accordance with well-known principles.

Many of the desired reactions may be carried out most satisfactorily in the molten state. Others are preferably carried out in any suitable liquid heat transfer medium, which may be a solvent for one or more reactants and/or reaction products, and which preferably has a high boiling point because some reactions are preferably carried out at a relatively high temperature. Numerous such liquids have been found to be suitable, among which may be mentioned the terphenyls; a eutectic mixture of 73.5% diphenyl oxide and 26.5% diphenyl, commercially available under the trademark "Dowtherm A"; mixtures of various polychlorinated biphenyls typified by those commercially available under the trademark "Therminol FR"; polyaromatic ethers and mixtures thereof such as those composed of mixtures of meta and para isomers, having boiling ranges in excess of 400° C., typified by those commercially available under the trademark "Therminol 77," and partially hydrogenated terphenyls having boiling ranges in excess of 340° C., typified by those commercially available under the trademark "Therminol 66."

One particularly desirable class of branched aromatic polyesters according to the invention comprises those polyesters of Formula I wherein each chain attached to the cyanuryl nucleus (i.e., $R^1$, $R^2$ and $R^3$) consists essentially of repeating p-oxybenzoyl moieties of Formula II, the average number of structural units in each chain being from 2 to about 40. Such polyesters correspond to Formula IX (IX)
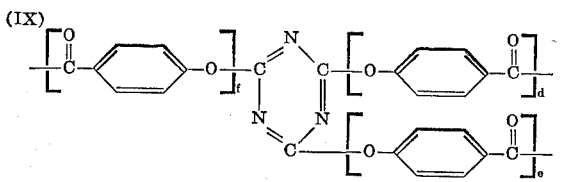

wherein $d$, $e$ and $f$ independently are integers from 2 to about 40 and the average of $d$, $e$ and $f$ is from 2 to about 40. Such polyesters may be readily prepared by the reaction of cyanuric chloride with a compound of Formula VI and condensation of the latter, as exemplified in Examples 1, 4 and 5. The average length of the chains attached to the cyanuryl nucleus is governed by the molar proportions of the reactants. The p-oxybenzoyl chains terminate with a terminal group corresponding to $R^5$ in Formula VI, thus these polyesters also correspond to Formula X (X)
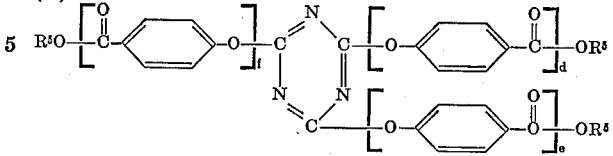

wherein $d$, $e$, $f$ and $R^5$ have the above-described meanings.

Example 1 illustrates the preparation of a prepolymer of this class of branched polyesters. The compound of Formula VI employed is the preferred compound, phenyl p-hydroxybenzoate, conveniently prepared by reacting p-hydroxybenzoic acid with phenyl acetate in the presence of HCl as a catalyst.

EXAMPLE 1

35.4 kg. (256.5 moles) of p-hydroxybenzoic acid and 43.6 kg. (320 moles) of phenyl acetate are placed into a 100 l. round bottom flask equipped with a stirrer, thermometer, distilling head, and a combination nitrogen-HCl inlet tube. The reaction mixture is stirred constantly under a nitrogen atmosphere throughout the run. The reaction mixture is heated to 180° C., forming a melt, and gaseous HCl is bubbled through the melt for 10.5 hours, the temperature being held at 180° C. Phenyl p-hydroxybenzoate is produced thereby, accompanied by distillation of acetic acid, the HCl serving as a catalyst. The HCl flow is discontinued and the temperature of the melt is reduced to 170° C., whereupon 8.27 kg. (44.8 moles) of cyanuric chloride is added. The temperature is held at 170° C. for 3.5 hours, then increased to 195° C. over a period of 2 hours. During this stage, some of the phenyl p-hydroxybenzoate reacts with all of the cyanuric chloride to produce tris(p - carbophenoxyphenyl) cyanurate, accompanied by liberation of HCl. The temperature of the melt is then increased from 195° C. to 250° C. over a period of 7 hours and held at 250° C. for 4 hours. During this stage, condensation occurs between the terminal phenoxy groups of the tris(p-carbophenoxyphenyl) cyanurate and the hydroxyl groups of the remaining phenyl p-hydroxybenzoate, accompanied by distillation of phenol and excess phenyl acetate. The remaining melt is poured into trays and allowed to cool to room temperature (about 25° C.), solidifying. A yield of 44 kg. is obtained. The product is pulverized, washed with trichloroethylene and extracted with n-heptane in a Soxhlet extractor to remove any residual phenol and phenyl acetate, and dried in vacuum at 110° C. for 2 hours. The product is a branched polyester prepolymer corresponding to Formulas IX and X wherein the average value of $d$, $e$ and $f$ is 2 and wherein $R^5$ is phenyl. A substantial proportion of the product corresponds to Formulas IX and X wherein each of $d$, $e$ and $f$ is 2. The product has a melting point of 350° C. as determined by differential thermal analysis at a heating rate of 20° C./minute. Saponification of the product and determination of the amount of phenol liberated indicates a phenyl terminal group content of 24.4%, corresponding closely to the theoretical amount of 24.0%. The product contains 4.1% nitrogen.

Prepolymers such as that produced in Example 1 are fusible. They may be heated with a compound of Formula VI to extend the p-oxybenzoyl chains and produce a branched, higher molecular weight polyester corresponding to Formulas IX and X with an average chain length of more than about 10 up to about 40 p-oxybenzoyl units. such polyesters being useful, for example, as thermoplastic molding compounds. This process is illustrated in Example 2. Such higher molecular weight polyesters may also be prepared directly, as illustrated in Examples 4 and 5.

Alternatively, prepolymers such as that produced in Example 1 may be cured by cross-linking by heating with any suitable crosslinking agent at a temperature sufficiently high to cause cross-linking, to produce a thermoset, cross-linked polyester having outstanding thermal stability. Such cross-linking is illustrated in Example 3. The cross-linked polyesters are useful, e.g., as adhesives, films, electrical insulations and the like. A wide variety of substances may serve as suitable cross-linking agents, including, for example, aromatic dihydroxyl compounds such as resorcinol and hydroquinone; aromatic dicarboxylic acids such as isophthalic acid and terephthalic acid; and low molecular weight polyesters containing aromatic structural units derived from such dihydroxy compounds or dicarboxylic acids, such as employed in Example 3.

The resulting melt is poured into a stainless steel tray and allowed to cool to room temperature, solidifying. The solid is ground to a powder. A yield of 1037 g. (93% of theory) is obtained. The product is a linear copolyester having a low average molecular weight of about 3600 and consisting essentially of three types of moieties or structural units, viz, p-oxybenzoyl, isophthaloyl and p-dioxyphenylene. The structural units are joined to each other through ester linkages forming polyester chains, which terminate with a hydroxyl group at each end because of the use of a molar excess of hydroquinone. The copolyester molecules contain about 30 structural units on the average, some of the molecules having Formula XI and the others having Formula XII

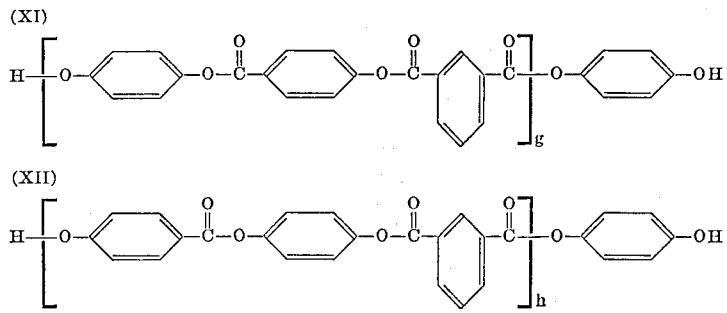

wherein $g$ and $h$ are each about 10 on the average.

The linear copolyester is employed as a cross-linking agent in stroke-curing a prepolymer of the invention as follows. 20 g. of the linear copolyester is blended with 10 g. of the prepolymer powder produced in Example 1 and the mixture is spread on the surface of a hot plate. The temperature of the hot plate is gradually increased. At about 200° C. the mixture forms a clear melt, which is continually agitated with a spatula as the temperature continues to rise. When most of the volatiles have been dissipated, agitation is discontinued and the melt is spread out into a film. As the temperature reaches about 370° C., the material solidifies to form a thin, flexible film consisting essentially of thermoset cross-linked polyester. The cross-linking presumably occurs initially by virtue of condensation between the terminal hydroxyl groups of the cross-linking agent and the terminal phenoxy groups of the branched prepolymer, and subsequently by ester-ester interchange reactions. Various conventional techniques may be employed whereby cross-linking is effected to produce shaped bodies, fiber-reinforced composites and the like.

EXAMPLE 2

12 g. (about 0.01 mole) of the prepolymer powder produced in Example 1 and 214 g. (1 mole) of phenyl p-hydroxybenzoate are slurried in 400 g. of a polyaromatic ether heat transfer medium (B.P. above 400° C.). The mixture is heated, with stirring and under a nitrogen atmosphere, until a homogeneous liquid forms and further to 320° C. where the temperature is held for 10 hours. During this time condensation occurs, accompanied by distillation of phenol, the p-oxybenzoyl chains of the branched prepolymer are extended, and the resulting polyester precipitates. The reaction mixture is mixed with boiling acetone and the polyester precipitate is removed by filtration, washed thoroughly with boiling acetone, and dried in air. A yield of 110 g. of polyester powder is obtained. The product is a branched polyester corresponding to Formulas IX and X wherein $R^5$ is phenyl and the average value of $d$, $e$ and $f$ is about 30.

EXAMPLE 3

An aromatic polyester useful as a cross-linking agent for the prepolymer of Example 1 is produced as follows. 414 g. (3 moles) of p-hydroxybenzoic acid, 510 g. (3.75 moles) of phenyl acetate and 954 g. (3 moles) of diphenyl isophthalate are charged into a four-necked resin kettle equipped with a thermometer, stirrer, distilling head and a combination nitrogen-HCl inlet tube. The reaction mixture is stirred constantly under a nitrogen atmosphere throughout the run. The reaction mixture is heated to 180° C., and HCl is then bubbled through the mixture for 7 hours, the temperature being held at 180° C. Phenyl p-hydroxybenzoate is thereby produced. The HCl flow is discontinued, the reaction mixture is heated to 200° C. at a rate of 10° C./hour, 363 g. (3.3 moles) of hydroquinone is added, and the temperature is further increased to 250° C. over a period of 2.5 hours. The distilling head is then heated to 190° C. by external heating means to prevent condensation in the distilling head of distillate subsequently to be produced. The reaction mixture is heated to 320° C. over a period of 6 hours, held at 320° C. for 16 hours, heated to 340° C. and held there for 3 hours. During this stage, condensation occurs between the phenyl p-hydroxybenzoate, diphenyl isophthalate and hydroquinone, accompanied by the distillation of phenol. A total of 1127 g. of distillate is collected during the entire run, the distillate containing acetic acid, phenol and the excess phenyl acetate.

EXAMPLE 4

414 g. (3 moles) of p-hydroxybenzoic acid, 510 g. (3.75 moles) of phenyl acetate and 1000 g. of a partially hydrogenated terphenyl heat transfer medium (boiling range 340–396° C.) are charged into a four-necked resin kettle equipped as in Example 3. The reaction mixture is stirred constantly under a nitrogen atmosphere throughout the run. The reaction mixture is heated to 180° C. and HCl is then bubbled through the mixture for 10 hours, the temperature being held at 180° C. The p-hydroxybenzoic acid is thereby converted to phenyl p-hydroxybenzoate, accompanied by distillation of acetic acid. The HCl flow is discontinued, the temperature is reduced to 170° C., and 5.53 g. (0.03 mole) of cyanuric chloride is added. The reaction mixture is held at 170° C. for 8.5 hours, during which the cyanuric chloride reacts with a small proportion of the phenyl p-hydroxybenzoate to produce tris(p-carbophenoxyphenyl) cyanurate, accompanied by liberation of HCl. Virtually no condensation of the phenyl p-hydroxybenzoate occurs during this stage.

The temperature of the reaction mixture is increased from 170° C. to 320° C. at a rate of 10° C./hour and held at 320° C. for 5 hours. Meanwhile, the distilling head is maintained at a temperature of 190° C. to prevent condensation of the distillate in the head. During this stage, condensation occurs as between the p-oxybenzoyl units attached to the cyanuryl nuclei and the phenyl p-hydroxybenzoate and/or autocondensation products thereof, chains of repeating p-oxybenzoyl units linked to cyanuryl nuclei thereby being elaborated. The condensation is accompanied by distillation of phenol. The resulting branched polyester forms a precipitate in the reaction mixture. A total of 589 g. of distillate containing acetic acid, phenol and the excess phenyl acetate is collected during the entire run.

The resulting polyester suspension is cooled to room temperature, congealing into a solid mass. The mass is extracted with acetone to remove the heat transfer medium and dried in vacuum. A yield of 330 g. (92.5% of theory) of polyester is obtained, the polyester corresponding to Formulas IX and X wherein $R^5$ is phenyl and the average of $d$, $e$ and $f$ is about 30. The polyester is essentially the same as the one produced in Example 2. Isothermal gravimetric analysis in air at 400° C. results in a weight loss of only 1.5%/hour.

EXAMPLE 5

414 g. (3 moles) of p-hydroxybenzoic acid, 510 g. (3.75 moles) of phenyl acetate and 1000 g. of a partially hydrogenated terphenyl heat transfer medium (boiling range 340-396° C.) are placed in a four-necked resin kettle equipped as in Example 3. The reaction mixture is stirred constantly under a nitrogen atmosphere throughout the run. The reaction mixture is heated to 180° C. and HCl is then bubbled through the mixture for 5 hours, the temperature being held at 180° C. The HCl flow is discontinued, the temperature is reduced to 170° C., 16.6 g. (0.09 mole) of cyanuric chloride is added, and the temperature is held at 170° C. for 8.5 hours. The temperature is then gradually increased to 250° C. over a period of 5 hours, held at 250° C. for 2 hours, gradually increased to 320° C. over a period of 6 hours, and held at 320° C. for 2 hours, the resulting polyester precipitating. A total of 595 g. of distillate is collected during the entire run.

The polyester suspension is cooled to 70° C., acetone is added, and the polyester is recovered by filtration, washed with acetone, extracted with acetone in a Soxhlet extractor, and dried in vacuum at 110° C. for 2 hours. A yield of 325 g. (88% of theory) of polyester is obtained the polyester corresponding to Formulas IX and X wherein $R^5$ is phenyl and the average of $d$, $e$ and $f$ is about 11. The polyester tends to flow when subjected to a shearing force at about 200° C. Isothermal gravimetric analysis in air at 400° C. results in a weight loss of only 1.9%/hour.

Another particularly desirable class of branched aromatic polyesters according to the invention comprises those polyesters of Formula I wherein each chain attached to the cyanuryl nucleus (i.e., $R^1$, $R^2$ and $R^3$) consists essentially of 1 meta- or para-dioxyarylene moiety of Formula IV and from 1 to about 40 p-oxybenzoyl moieties of Formula II. Such polyesters are represented by Formula I wherein $b$ is 0, $c$ is 1, and $a$ is an integer from 1 to about 40.

One preferred embodiment of such polyesters contemplates a prepolymer having Formula XIII (XIII)

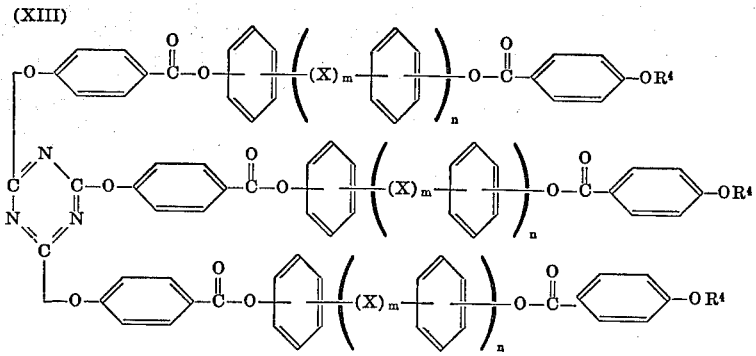

wherein X, $m$, $n$ and $R^4$ have the above-described meanings, $R^4$ representing the terminal groups. Such prepolymers correspond to Formula I wherein $b$ is 0, $c$ is 1, and $a$ is 2. They may readily be prepared by condensation of a compound of Formula VI with a compound of Formula VIII in a molar ratio of 2:1 to produce a linear polyester of Formula XIV (XIV)

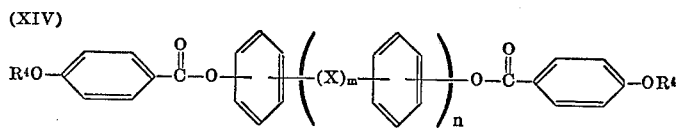

wherein X, $m$, $n$ and $R^4$ have the above-described meanings and $R^4$ corresponds to the particular $R^4$ group of the compound of Formula VI employed, and then producing branching by reacting the linear polyester with cyanuric chloride in a molar ratio of 3:1, as illustrated in Example 6.

A second preferred embodiment of this class of polyesters contemplates a prepolymer having Formula XV (XV)

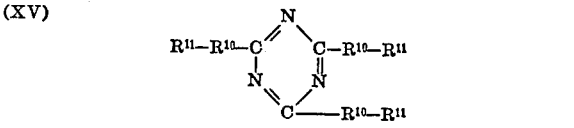

wherein $R^{10}$ has Formula XVI (XVI)

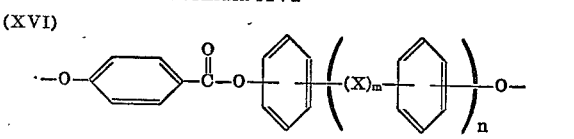

with either end linked to the cyanuryl nucleus carbon atoms, and wherein $R^{11}$ is a terminal group selected from the group consisting of lower alkanoyl, benzoyl and hydrogen. Such prepolymers correspond to Formula I where $b$ is 0, $c$ is 1, and $a$ is 1. They may readily be prepared by condensation of a compound of Formula VI with a compound of Formula VIII in a molar ratio of 1:1 to produce an ester of Formula XVII (XVII)

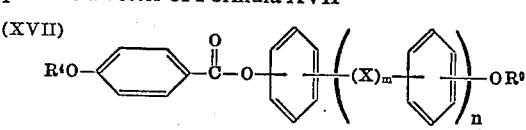

wherein X, $m$, $n$, $R^4$ and $R^9$ have the above-described meanings and $R^4$ and $R^9$ correspond to the particular $R^4$ to $R^9$ groups of the reactants employed, and then producing branching by reacting the ester with cyanuric chloride in a molar ratio of 3:1, as illustrated in Example 7. It is apparent that $R^{11}$ in Formula XV corresponds to $R^4$ or $R^9$ in Formula XVII.

A third preferred embodiment contemplates reacting a prepolymer of Formulas XIII or XV with a molar excess of a compound of Formula VI whereby condensation occurs and the chains of the branched prepolymer are extended by the addition of repeating p-oxybenzoyl moieties. This extension of the chain is analogous to that illustrated in Example 2, and substantially the same conditions may be employed. The polyesters so produced contain only one dioxyarylene moiety in each chain but may contain up to about 40 p-oxybenzoyl units in each chain, depending upon the molar ratio of the reactants.

EXAMPLE 6

338 g. (1.74 moles) of p-phenylene diacetate, 480 g. (3.48 moles) of p-hydroxybenzoic acid and 500 g. of a polyaromatic ether heat transfer medium (B.P. above 400° C.) are placed in a four-necked resin kettle equipped as in Example 3. The reaction mixture is constantly stirred under a nitrogen atmosphere throughout the run. The reaction mixture is heated to 180° C. and gaseous HCl is then bubbled through the mixture as a catalyst for 5 hours, the temperature being held at 180° C. The HCl flow is then discontinued. The mixture in the resin kettle at this point comprises a suspension of a linear polyester having Formula XIV wherein $R^4$ is hydrogen, $n$ is 0, and the dioxyarylene moiety is para-dioxyphenylene. The polyester is formed by condensation of the reactants, accompanied by distillation of acetic acid.

To the contents of the resin kettle are added 500 g. of the same heat transfer medium and 107.5 g. (0.583 mole) of cyanuric chloride, and the temperature of the reaction mixture is held at 180° C. for 8 hours. During this stage the polyester reacts with the cyanuric chloride to produce a branched polyester prepolymer with the accompanying liberation of HCl, the prepolymer being in suspension.

The mixture is cooled to 80° C., acetone is added, and the mixture is filtered to recover the product. The product is washed with acetone and is then subjected to extraction with acetone overnight in a Soxhlet extractor. The product is dried in vacuum at 110° C. for 2 hours.

A yield of 547 g. (83.8% of theory) of prepolymer powder is obtained. The prepolymer has Formula XIII wherein $n$ is 0, $R^4$ is hydrogen, and the dioxyarylene moieties are para-dioxyphenylene. The polyester powder forms a clear melt at a temperature of about 340° C.

EXAMPLE 7

828 g. (6 moles) of p-hydroxybenzoic acid and 1020 g. (6.5 moles) of phenyl acetate are charged into a four-necked resin kettle equipped as in Example 3. The reaction mixture is stirred constantly under a nitrogen atmosphere throughout the run. The reaction mixture is heated to 180° C., and gaseous HCl is then bubbled through the mixture for 7 hours, the temperature being held at 180° C. Phenyl p-hydroxybenzoate is produced thereby. The HCl flow is discontinued and 660 g. (6 moles) of hydroquinone is added to the charge. The distilling head is heated to 180° C., and the reaction mixture is heated from 180° C. to 230° C. at a rate of 10° C./hour, held for 4.5 hours at 230° C., and heated to 240° C. where the temperature is held for 2 hours. The resulting pasty melt is poured while hot into a tray and allowed to cool and solidify, whereupon it is pulverized. A yield of 1413 g. is obtained. The product consists primarily of an ester, p-hydroxyphenyl p-hydroxybenzoate, having Formula XVII wherein $R^4$ and $R^9$ are each hydrogen, $n$ is 0, and the dioxyarylene moiety is para-dioxyphenylene. The product also contains a linear polyester identical to that produced in Example 6. The desired ester is separable from the linear polyester by virtue of its greater solubility in such solvents as acetone. Accordingly, the product is extracted with hot acetone to obtain a solution of the ester and water is added to the solution to precipitate the ester, which is removed by filtration, dried in vacuum, and crystallized from aqueous isopropyl alcohol. The ester is found to have a melting point of 243° C. upon differential thermal analysis.

460 g. (2 moles) of the ester and 123 g. (0.67 mole) of cyanuric chloride are suspended in 500 g. of a polyaromatic ether heat transfer medium (B.P. above 400° C.) in a four-necked resin kettle equipped as in Example 3. The mixture is stirred constantly under a nitrogen atmosphere throughout the run. The mixture is heated to 180° C., where the temperature is held for 10 hours. During this period, the ester reacts with the cyanuric chloride to produce a branched polyester prepolymer, the reaction being accompanied by liberation of HCl. The reaction mixture is cooled to 80° C. and acetone is added thereto. The polyester product is recovered by filtration, washed with acetone and then extracted with acetone in a Soxhlet extractor, and dried in vacuum at 110° C. The product is a branched polyester prepolymer corresponding to Formula XV wherein $R^{11}$ is hydrogen and $R^{10}$ has the Formula XVI wherein $n$ is 0 and the dioxylene moieties are para-dioxyphenylene.

Prepolymers of Formula XIII may be cured to produce very thermally stable thermoset polyesters. Such curing may be accomplished by heating the prepolymer above its melting point, as shown in Example 8.

EXAMPLE 8

5 g. of the branched polyester prepolymer prepared in Example 6 is placed on the surface of a hot plate at room temperature and the temperature is gradually increased to 360° C., the material melting at about 340° C. The material is spread out into a film and agitated continuously with a spatula while the temperature is held at 360° C. After about 45 minutes, the material is transformed into a powder as a result of curing, which presumably occurs by ester-ester interchange reactions. The product does not melt, but decomposes above 450° C., and shows a weight loss in air at 400° C. of only 3%/hour. Analysis shows that the product contains 3.0% nitrogen.

Prepolymers of Formula XIII may also be cross-linked by suspending the prepolymer in a suitable liquid heat transfer medium with cyanuric chloride as a cross-linking agent, preferably in an amount of about ⅓ mole per mole of prepolymer, and heating to a suitable temperature, preferably at least about 150–180° C., whereby a cross-linked polyester is obtained which consists essentially of structural units having Formula XVIII (XVIII)

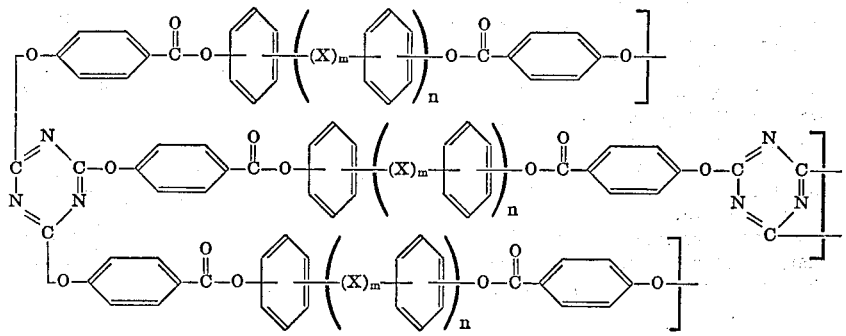

wherein X, m and n have the above-described meanings. Cross-linking the prepolymer of Example 6 in this manner produces a highly cross-linked polyester consisting essentially of structural units having Formula XVIII wherein n is 0 and the dioxyarylene moieties are para-dioxyphenylene.

In the same manner, prepolymers of Formula XV may be cross-linked with cyanuric chloride to produce highly cross-linked and very thermally stable polyesters consisting essentially of structural units having Formula XIX (XIX)
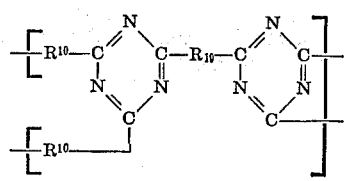

wherein $R^{10}$ has Formula XVI as described above. Cross-linking the prepolymer of Example 7 in this manner produces a cross-linked polyester consisting essentially of structural units having Formula XIX wherein n is 0 and the dioxyarylene moieties are para-dioxyphenylene.

Another particularly desirable class of branched aromatic polyesters according to the invention comprises those polyesters of Formula I wherein each chain attached to the cyanuryl nucleus (i.e., $R^1$, $R^2$ and $R^3$) contains at least one of each of the three moieties of Formulas II, III and IV; that is, a, b and c are each at least 1. It is apparent that each chain must contain at least three structural units, and that the average value of a, b and c for $R^1$, $R^2$ and $R^3$ must be at least 3. In the chains of this class of polyesters, the ratio of b to c is approximately 1:1. Since the p-oxybenzoyl moiety of Formula II is capable of forming blocks of repeating p-oxybenzoyl units in such chains, the ratio of a:b:c may be as high as about 10:1:1, but since the moieties of Formulas III and IV are capable of forming chains in which such moieties alternate and form repeating blocks, the ratio of a:b:c may be as low as about 1:10:10.

Preferably the ratio of a:b:c is about 1:1:1. In this case, the three moieties are capable of linking in either of two sequences, represened by Formulas XX and XXI (XX)
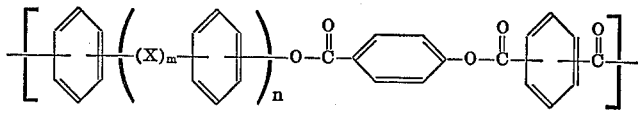

(XXI)
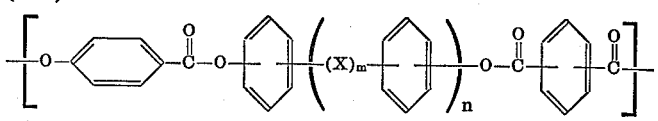

wherein X, m and n have the above-described meanings. Accordingly, the polyesters wherein the ratio of a:b:c is about 1:1:1 correspond to Formula XII (XXII)
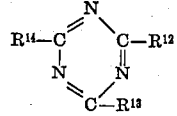

wherein $R^{12}$, $R^{13}$ and $R^{14}$ independently consist essentially of one or more groups of Formula XX or one or more groups of Formula XXI with a total number of p-oxybenzoyl, dioxyarylene and isophthaloyl or terephthaloyl units of from 3 to about 40 in each of $R^{12}$, $R^{13}$ and $R^{14}$.

Branched polyesters containing each of the three moieties are conveniently prepared by first condensing reactants of Formulas VI, VII and VIII in the desired proportions to form a linear copolyester containing the three moieties in the desired proportions, and then reacting the linear copolyester with about ⅓ of its molar amount of cyanuric chloride to produce branching. Example 9 illustrates the preparation of a preferred branched polyester containing the three moieties in a ratio of about 1:1:1. Example 10 illustrates the preparation of a linear polyester which is branched to produce a polyester according to the invention, wherein the ratio of a:b:c is about 8:1:1, the chains containing blocks of repeating p-oxybenzoyl units.

EXAMPLE 9

108 g. (0.03 mole) of the linear copolyester produced in Example 3, 1.84 g. (0.01 mole) of cyanuric chloride and 100 g. of a partially hydrogenated terphenyl heat transfer medium (boiling range 340–396° C.) are charged into a four-necked resin kettle equipped as in Example 3. The reaction mixture is stirred constantly under a nitrogen atmosphere throughout the run. The reaction mixture is heated to 180° C. where the temperature is held for 10 hours. During this period, the cyanuric chloride reacts with the copolyester to produce a branched polyester, HCl being liberated. The resulting polyester suspension is cooled to room temperature, acetone is added, and the polyester is recovered by filtration, washed with acetone and dried in vacuum at 110° C. for 2 hours. The product is a branched polyester having Formula XXII wherein $R^{12}$, $R^{13}$ and $R^{14}$ have the above-described meaning; the dicarbonyl moiety is isophthaloyl; the dioxyarylene moiety is p-dioxyphenylene; the ratio of p-oxybenzoyl units to isophthaloyl units to p-dioxyphenylene units is about 1:1:1; and the total number of p-oxybenzoyl, isophthaloyl and p-dioxyphenylene units in $R^{12}$, $R^{13}$ and $I^{14}$ averages about 30.

EXAMPLE 10

138 g. (1 mole) of p-hydroxybenzoic acid, 170 g. (1.25 moles) of phenyl acetate and 39.75 g. (0.125 mole) of diphenyl isophthalate are placed in a four-necked resin kettle equipped as in Example 3. The mixture is heated to 180° C., and HCl is then bubbled through the resulting melt for 8 hours, during which the temperature is held at 180° C. for 6 hours and subsequently at 200° C. for 2 hours. Phenyl p-hydroxybenzoate is produced thereby. The HCl flow is discontinued, and 30.6 g. (0.250 mole) of hydroquinone and 500 g. of a polyaromatic ether heat transfer medium (B.P. above 400° C.) are added. The temperature is then raised to 280° C. where it is held for 1 hour, raised to 300° C. where it is held for 2 hours, and raised to 320° C. where it is held for 5 hours. The mixture is cooled and acetone is added. The product is recovered by filtration, washed with acetone, extracted with acetone overnight in a Soxhlet extractor, and dried in vacuum at 110° C. The product is a linear copolyester consisting essentially of moieties of Formulas II, III and IV in a ratio of about 8:1:1, wherein the moiety of Formula III is isophthaloyl and the moiety of Formula IV is para-dioxyphenylene, and the average number of moieties in the copolyester chain is about 10.

The linear copolyester is reacted with about ⅓ of its molar amount of cyanuric chloride, in substantial accordance with the procedure of Example 9, to produce a branched polyester of Formula I wherein the moiety of Formula III is isophthaloyl and the moiety of Formula IV is para-dioxyphenylene, the ratio of a:b:c is about 8:1:1, and a+b+c is about 10, the polyester chains containing blocks of repeating p-oxybenzoyl units.

These branched polyesters containing each of the three moieties of Formulas II, III and IV, as exemplified by those produced in Examples 9 and 10, are especially useful as thermosetting polyesters, since they may be cured by heating at a sufficiently high temperature, preferably above 300° C., to cause cross-linking to occur, whereby an extremely thermally stable cross-linked polyester is produced. Such cross-linking presumably occurs by ester-ester interchange.

Still another particularly desirable class of branched aromatic polyesters according to the invention comprises those polyesters of Formula I wherein each chain attached to the cyanuryl nucleus (i.e., $R^1$, $R^2$ and $R^3$) lacks the p-oxybenzoyl moiety of Formula II and contains from 1 to about 20 of each of the moieties of Formulas III and IV, the ratio of these two being about 1:1. Such polyesters are represented by Formula I wherein $a$ is 0, $b$ and $c$ are each an integer from 1 to about 20, and the ratio of $b:c$ is about 1:1. In chains containing more than one unit of each moiety, the moieties of Formula III alternate with the moieties of Formula IV. The polyesters of this class have the structure of Formula XXIII (XXIII)

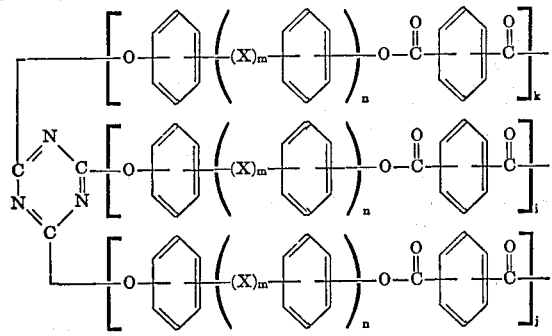

wherein $i$, $j$ and $k$ independently are integers from 1 to about 20 and X, $m$ and $n$ have the above-described meanings. Such polyesters are useful, for example, as molding compounds from which shaped articles may be formed by conventional techniques.

Such branched polyesters may readily be produced by the condensation of compounds of Formulas VII and VIII to form a linear polyester, and reaction of the linear polyester with about 1/3 of the molar amount thereof of cyanuric chloride to produce branching. It will be understood that the chains attached to the cyanuric nucleus may have as the final moiety an isophthaloyl or terephthaloyl moiety, or a dioxyarylene moiety. Accordingly, the terminal groups of the chains correspond respectively to $R^6$ or $R^7$ of the compound of Formula VII or to $R^8$ or $R^9$ of the compound of Formula VIII. Therefore, the branched polyesters of Formula XXIII may correspond to Formulas XXIV or XXV (XXIV)

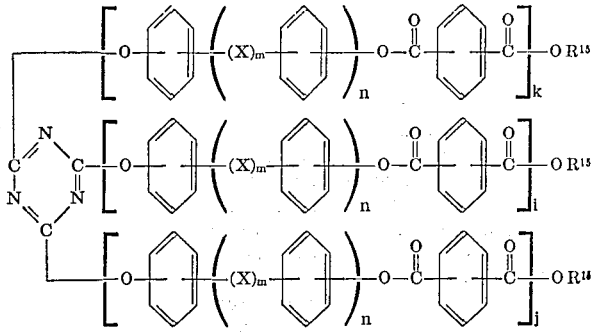

(XXV)

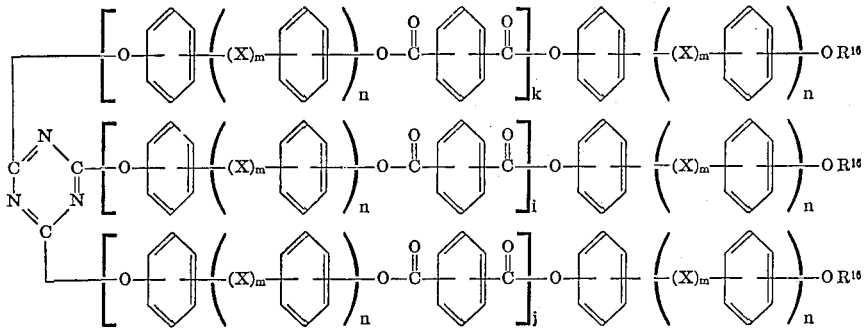

wherein $R^{15}$ is a terminal group selected from the group consisting of hydrogen, lower alkyl, benzyl, phenyl, and phenyl wherein one or more hydrogens are replaced by halogen or lower alkyl; $R^{16}$ is a terminal group selected from the group consisting of lower alkanoyl, benzoyl, and hydrogen; and X, $m$, $n$, $i$, $j$ and $k$ have the above-described meanings.

Example 11 illustrates the preparation of a prepolymer of this class of branched polyesters.

EXAMPLE 11

330 g. (3 moles) of hydroquinone and 974 g. (3 moles) of diphenyl isophthalate are placed in a four-necked resin kettle equipped as in Example 3. The reaction mixture is stirred constantly under a nitrogen atmosphere throughout the run. The mixture is heated to 250° C., forming a melt, and the temperature is maintained at 250° C. for 16 hours. During this period the hydroquinone and diphenyl isophthalate react to produce, as the principal product, p-hydroxyphenyl phenyl isophthalate, i.e., an ester of the formula

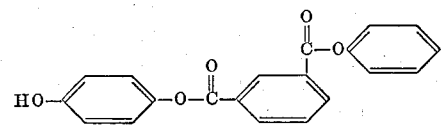

The reaction is accompanied by distillation of 281 g. (3 moles) of phenol. The product may also contain small amounts of unreacted raw materials and/or higher condensation products.

The temperature is reduced to 170° C., 184 g. (1 mole) of cyanuric chloride is added, and the temperature is held at 170° C. for 8 hours. During this period, the reaction mixture becomes a very viscous melt as a result of the reaction of the cyanuric chloride and ester to produce a branched polyester prepolymer.

The melt is heated to 210° C. to reduce its viscosity, poured into a tray and allowed to cool to room temperature, solidifying. The solid is ground to a fine powder. A yield of 1093 g. (near theoretical) is obtained. The product consists primarily of a branched polyester prepolymer corresponding to Formulas XXIII and XXIV wherein $n$ is 0; the dicarbonyl moiety is isophthaloyl; the dioxyarylene moiety is para-dioxyphenylene; $i$, $j$ and $k$ are each 1; and $R^{15}$ is phenyl.

Prepolymers such as that produced in Example 11 may be cured by cross-linking to produce thermoset polyesters having outstanding thermal stability. This may be accomplished by heating the prepolymer with an aromatic dihydroxyl compound to a temperature sufficient to produce cross-linking. Such cross-linking is illustrated in Example 12, the cross-linking agent being the linear copolyester produced in Example 3.

solidifying. The solid is ground to a fine powder. The product is an ester (M.P. 150° C.) of the formula

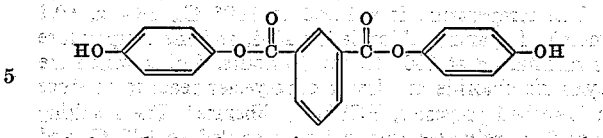

A branched polyester is prepared from the ester by mixing the ester in a heat transfer medium, "Dowtherm A," heating the mixture to 190° C., and gradually adding ⅓ mole of cyanuric chloride per mole of the ester. Thereby is produced a prepolymer corresponding to Formula XXV wherein $R^{16}$ is hydrogen; $n$ is 0; $i$, $j$ and $k$ are each 1; the dicarbonyl moiety is isophthaloyl; and the dioxyarylene moiety is p-dioxyphenylene.

Prepolymers such as that produced in Example 13 may be cured by cross-linking with additional cyanuric chloride to produce highly cross-linked polyesters possessing marked thermal stability. The cross-linking may be effected by suspending the prepolymer in a suitable liquid heat transfer medium with about ⅓ mole of cyanuric chloride per mole of prepolymer, and heating to a sufficiently high temperature, preferably about 150–180° C. The product is a crosslinked polyester consisting essentially of structural units having Formula XXVI (XXVI)

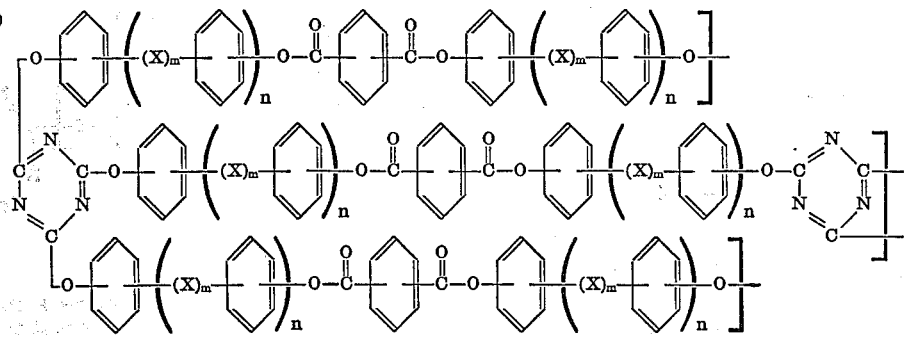
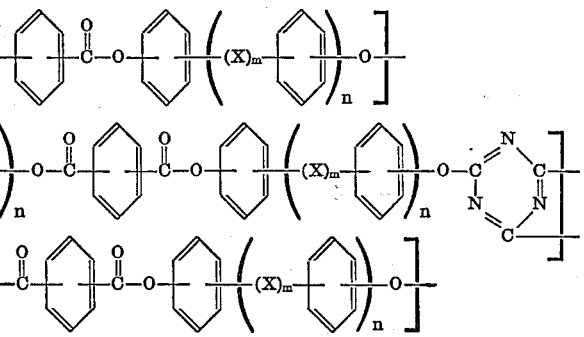

EXAMPLE 12

4 g. of the linear copolyester produced in Example 3 and 1 g. of the branched polyester prepolymer produced in Example 11 are blended and spread on the surface of a hot plate. The temperature of the hot plate is gradually increased. At about 250° C. the mixture forms a melt, which is then continually agitated with a spatula as the temperature continues to rise to 350° C. The temperature is held at 350° C., with continued agitation. When most of the volatiles have been dissipated, agitation is discontinued and the melt is spread out into a film. After a total time of about 1 hour a thin, flexible, strong, transparent film is formed consisting essentially of thermoset cross-linked polyester. The cross-linking presumably occurs initially by condensation between the terminal hydroxyl groups of the linear copolyester and the terminal phenoxy groups of the branched prepolymer, and subsequently by ester-ester interchange reactions.

Example 13 illustrates the preparation of another prepolymer, corresponding to Formula XXV.

EXAMPLE 13

440 g. (4 moles) of hydroquinone and 636 g. (2 moles) of diphenyl isophthalate are placed in a four-necked resin kettle equipped as in Example 3. The reaction mixture is stirred constantly under a nitrogen atmosphere throughout the run. The temperature of the distilling head is set at 180° C. and the reaction mixture is heated to 250° C., forming a melt. The temperature of the mixture is held at 250° C. for 7 hours, during which 367 g. of distillate, primarily phenol, is collected. The resulting melt is poured into a tray and allowed to cool to room temperature, wherein X, $m$ and $n$ have the above-described meanings. Cross-linking the prepolymer produced in Example 13 in this manner produces a cross-linked polyester consisting essentially of structural units having Formula XXVI wherein $n$ is 0, the dioxyarylene moieties are p-dioxyphenylene, and the dicarbonyl moieties are isophthaloyl.

Example 14 illustrates the preparation of a branched polyester wherein the chains consist essentially of alternating moieties of Formulas III and IV.

EXAMPLE 14

954 g. (3 moles) of diphenyl isophthalate, 363 g. (3.3 moles) of hydroquinone, and 1000 g. of a partially hydrogenated terphenyl heat transfer medium (boiling range 340–396° C.) are placed in a four-necked resin kettle equipped as in Example 3. The reaction mixture is stirred constantly under a nitrogen atmosphere throughout the run. The mixture is heated to 250° C., then heated from 250° C. to 300° C. at a rate of 5° C./hour, and finally held at 300° C. until approximately the theoretical amount of phenol (564 g.) for complete condensation has distilled off (about 10 hours). The product of the condensation reaction is a linear polyester corresponding to the formula

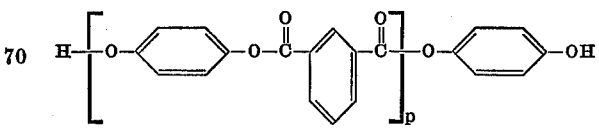

wherein the average value of $p$ is about 10. The polyester chains terminate at each end with a dioxyphenylene moiety by virtue of the molar excess of hydroquinone employed, the extent of such excess regulating the average value of $p$.

The temperature is reduced to 180° C., 18.4 g. (0.1 mole) of cyanuric chloride is added, and the temperature is maintained at 180° C. for 10 hours, during which the cyanuric chloride and linear copolyester react to produce a branched polyester, HCl being liberated. The resulting branched polyester suspension is cooled to 80° C. and acetone is added. The polyester is removed by filtration, washed with acetone, and dried in vacuum at 110° C. for 2 hours. The product is a branched polyester corresponding to Formulas XXIII and XXV wherein $n$ is 0; the average of $i$, $j$ and $k$ is about 10; the dicarbonyl moiety is isophthaloyl; the dioxyarylene moiety is p-dioxyphenylene; and $R^{16}$ is hydrogen.

While the invention has been described herein with reference to certain examples and preferred embodiments, it is to be understood that various changes and modifications may be made by those skilled in the art without departing from the concept of the invention, the scope of which is to be determined by reference to the following claims.

We claim:

1. A branched aromatic polyester of the formula (I)
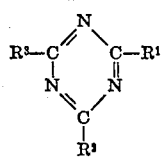

wherein $R^1$, $R^2$ and $R^3$ each consist essentially of substituent(s) selected from the group consisting of (II)
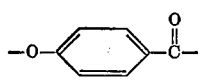

mixtures of II and (III)
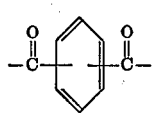

mixtures of II and (IV)
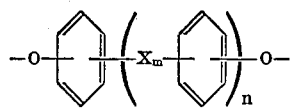

mixtures of III and IV, and mixtures of II, III and IV, wherein X is —O—,

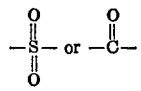

$n$ is 0 or 1, $m$ being 0 or 1 when $n$ is 1, the carbonyl groups of III are meta or para to each other, the oxy groups of IV are meta or para to each other, the oxy groups of II and IV are linked to a carbonyl group of II or III or to a carbon atom of the cyanuryl nucleus, the carbonyl groups of II and III are linked to an oxy group of II or IV, the carbon atoms of cyanuryl nucleus,

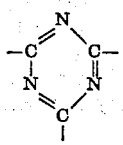

are linked to an oxy group II or IV, $a$, the number of moieties of II in the branched aromatic polyester, is from 0 to about 40, $b$, the number of moieties of III in said polyester is from 0 to about 20, $c$, the number of moieties of Formula IV in said polyester is from 0 to about 20 the sum of $a$, $b$, and $c$, is an integer from 2 to about 40, $R^1$, $R^2$ and $R^3$ end in terminal group(s) selected from the group consisting of hydroxyl, lower alkoxy, benzoxy, phenoxy and phenoxy wherein at least one hydrogen is replaced by halogen or lower alkyl, when the end moiety is III or the carbonyl portion of II is at the end, and end in terminal group(s) selected from the group consisting of hydrogen, lower alkanoyl and benzoyl, when the end group moiety is IV or the —O portion of II is at the end.

2. A branched aromatic polyester as set forth in claim 1 wherein $n$ is 0.

3. A branched aromatic polyester as set forth in claim 1 wherein $R^1$, $R^2$ and $R^3$ each consist essentially of the same types of moieties in approximately the same proportions.

4. A branched aromatic polyester as set forth in claim 1 wherein $a$ is an integer from 1 to about 40.

5. A branched aromatic polyester as set forth in claim 2 wherein $a$ is an integer from 1 to about 40.

6. A branched aromatic polyester as set forth in claim 3 wherein $a$ is an integer from 1 to about 40.

7. A branched aromatic polyester as set forth in claim 1 of the formula

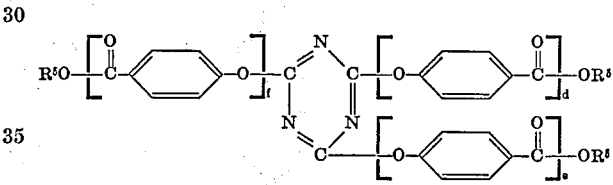

wherein $R^5$ represents a terminal group and is selected from the group consisting of hydrogen, lower alkyl, benzyl, phenyl and phenyl wherein at least one hydrogen is replaced by halogen or lower alkyl and $d$, $e$, and $f$ are independent integers from 2 to about 40.

8. A branched aromatic polyester as set forth in claim 7 wherein $R^5$ is phenyl.

9. A branched aromatic polyester prepolymer as set forth in claim 7 wherein $d$, $e$, and $f$ independently are integers from 2 to about 10.

10. A branched aromatic polyester prepolymer as set forth in claim 9 wherein $R^5$ is phenyl.

11. A branched aromatic polyester prepolymer as set forth in claim 10 wherein each of $d$, $e$ and $f$ is 2.

References Cited

UNITED STATES PATENTS

| | | | |
|---|---|---|---|
| 3,050,496 | 8/1962 | D'Alelio | 260—45.4 |
| 3,047,532 | 7/1962 | D'Alelio | 260—45.4 |
| 3,536,664 | 10/1970 | Picklesimer | 260—47 |
| 3,637,595 | 1/1972 | Cottis et al. | 260—47 |

LESTER L. LEE, Primary Examiner

U.S. Cl. X.R.

117—161 K; 161—231; 260—47 CZ, 248 SC, 873